United States Patent
Fitzgerald

(10) Patent No.: US 12,289,387 B2
(45) Date of Patent: Apr. 29, 2025

(54) LOW POWER IDLE PHY LINK SYNCHRONIZATION

(71) Applicant: Analog Devices International Unlimited Company, Limerick (IE)

(72) Inventor: Niall Fitzgerald, Dublin (IE)

(73) Assignee: Analog Devices International Unlimited Company, Limerick (IE)

( * ) Notice: Subject to any disclaimer, the term of this patent is extended or adjusted under 35 U.S.C. 154(b) by 627 days.

(21) Appl. No.: 17/612,974

(22) PCT Filed: May 15, 2020

(86) PCT No.: PCT/EP2020/063632
§ 371 (c)(1),
(2) Date: Nov. 19, 2021

(87) PCT Pub. No.: WO2020/234161
PCT Pub. Date: Nov. 26, 2020

(65) Prior Publication Data
US 2022/0216978 A1      Jul. 7, 2022

Related U.S. Application Data

(60) Provisional application No. 62/850,151, filed on May 20, 2019.

(51) Int. Cl.
H04L 7/00      (2006.01)
(52) U.S. Cl.
CPC .......... *H04L 7/0016* (2013.01); *H04L 7/0004* (2013.01)
(58) Field of Classification Search
None
See application file for complete search history.

(56) References Cited

U.S. PATENT DOCUMENTS 7,936,777 B2   5/2011  Wang et al.
8,621,255 B2   12/2013 Wang et al.
(Continued)

FOREIGN PATENT DOCUMENTS

CN   101789877   7/2010
CN   113853767   12/2021
(Continued)

OTHER PUBLICATIONS

Analog Dervices, IEEE Draft P802.3cg/D3.0 10BASE-T1L LPI synchronization, Dated: May 1, 2019. Filename: mccarthy_3cg_02_0519.pdf, downloaded from https://grouper.ieee.org/groups/802/3/cg/public/May2019/Allfiles. (Year: 2019).*
(Continued)

*Primary Examiner* — Liem H. Nguyen
(74) *Attorney, Agent, or Firm* — Schwegman Lundberg & Woessner, P.A.

(57) ABSTRACT

Systems and methods are provided for synchronizing a lower-power idle state. The systems and methods perform operations comprising: initializing, by a master physical layer (PHY) controller, a connection over a network with a slave PHY controller; during initialization, synchronizing a low power idle (LPI) timer of the master PHY controller with a LPI timer of the slave PHY controller; establishing an offset between the LPI timer of the master PHY controller and the LPI timer of the slave PHY controller; and after synchronizing the timer of the master PHY controller with the LPI timer of the slave PHY controller, establishing a link between the master PHY controller and the slave PHY controller to enable the master PHY controller and the slave PHY controller to exchange data.

29 Claims, 11 Drawing Sheets

(56) References Cited

U.S. PATENT DOCUMENTS

| | | | |
|---|---|---|---|
| 8,630,314 B2 | 1/2014 | York | |
| 8,711,876 B2 | 4/2014 | Parnaby | |
| 9,031,093 B2 | 5/2015 | Lusted et al. | |
| 9,049,120 B1 | 6/2015 | Vijayaraghavan et al. | |
| 9,184,861 B2 | 11/2015 | Aweya | |
| 9,979,507 B1 | 5/2018 | Lo | |
| 10,362,107 B2 | 7/2019 | Long et al. | |
| 2002/0037007 A1* | 3/2002 | Gross | H04J 3/0658 370/386 |
| 2010/0046543 A1 | 2/2010 | Parnaby | |
| 2010/0322078 A1* | 12/2010 | Wang | H04L 12/12 370/241 |
| 2012/0263195 A1* | 10/2012 | Li | G04G 7/02 370/510 |
| 2013/0016736 A1* | 1/2013 | Parnaby | H04L 12/12 370/465 |
| 2013/0054995 A1* | 2/2013 | Dove | H04L 12/40039 713/323 |
| 2014/0044133 A1* | 2/2014 | Wang | H04J 3/0697 370/395.62 |
| 2014/0126444 A1* | 5/2014 | Tseng | G06F 1/3209 370/311 |
| 2015/0078404 A1* | 3/2015 | Diab | H04J 3/0697 370/503 |
| 2017/0222684 A1* | 8/2017 | Khan | H04L 69/323 |
| 2021/0226822 A1* | 7/2021 | Graber | G06F 18/214 |
| 2022/0283968 A1* | 9/2022 | Kim | G06F 13/1689 |
| 2023/0042887 A1* | 2/2023 | Cansancao | H02J 3/42 |

FOREIGN PATENT DOCUMENTS

| | | |
|---|---|---|
| JP | 2014096797 | 5/2014 |
| JP | 2014116943 | 6/2014 |
| JP | 2018101917 | 6/2018 |
| KR | 102582858 | 9/2023 |

OTHER PUBLICATIONS

"Chinese Application Serial No. 202080037193.1. Office Action mailed Mar. 7, 2023", 9 pgs.

"European Application Serial No. 20727200.6, Communication Pursuant to Article 94(3) EPC malled Mar. 30, 2023", 5 pgs.

"P802.3cg D3.0 10BASE-T1L LPI synchronization", Analog Devices, IEEE Draft; McCarthy_3CG_02_0519, IEEE-SA, Piscataway, NJ, USA, vol. 802.3cg;802.3.10BPE, [Online] Retrieved from the internet: <http://grouper.ieee.org/groups/802/3/cg/public/May2019/mccarthy_3cg_02_0519.pdf>, (May 16, 2019), 11 pgs.

"IEEE P802.3ch(TM) D0.5 Draft Standard for Ethernet: Amendment: Physical Layer Specifications and Management Parameters for Greater Than 1Gb s Automotive Ethernet", LAN MAN Standards Committee: IEEE Draft; P8023CH_D0P5, IEEE-SA, Piscataway, NJ, USA, vol. 802.3ch; 802.3.NGAUTO, No. D0p5, [Online] Retrieved from the internet: < grouper.ieee.org/groups/802/3/ch/private/P8023ch_D0p5.pdf>, (Aug. 2, 2018), 151 pgs.

"Japanese Application Serial No. 2021-568948, Notification of Reasons for Refusal mailed Apr. 17, 2023", 4 pgs.

Graber, Steffen, et al., "10 Mb/s Single Twisted Pair Ethernet, 10BASE-T1L EEE", IEEE P802cg, (Sep. 4, 2018), 9 pgs.

Lv, Guangshen, et al., "An Implementation of Low-power Data Transmission Based on Time Synchronization", IEEE 8th International Conference on Wireless Communications, Networking and Mobile Computing, (2012), 5 pgs.

McCarthy, Mick, et al., "10BASE-T1L Lpi synchronization: Proposal relating to comment i-285", IEEE Draft P802.cg/D3.0, (May 24, 2019), 15 pgs.

* cited by examiner

LOW POWER IDLE PHY LINK SYNCHRONIZATION

CROSS-REFERENCE TO RELATED APPLICATION

This document is a U.S. National Stage of PCT Application Serial No. PCT/EP2020/063632, filed May 15, 2020, and published on Nov. 26, 2020, as WO 2020/234161 A1, which is a non-provisional application that claims the benefit of U.S. Provisional Application No. 62/850, 151, filed May 20, 2019, which are hereby incorporated by reference in their entirety.

FIELD OF THE DISCLOSURE

This document pertains generally, but not by way of limitation, to low power idle (LPI) synchronization in a physical layer (PHY) of a communication system.

SUMMARY OF THE DISCLOSURE

This disclosure describes systems and methods to synchronize LPI states in a master and slave device. In particular, the systems and methods perform operations comprising: initializing, by a master physical layer (PHY) controller, a connection over a network with a slave PHY controller; synchronizing a low power idle (LPI) timer of the master PHY controller with a LPI timer of the slave PHY controller; establishing an offset between the LPI timer of the master PHY controller and the LPI timer of the slave PHY controller; and after synchronizing the timer of the master PHY controller with the LPI timer of the slave PHY controller, establishing a link between the master PHY controller and the slave PHY controller to enable the master PHY controller and the slave PHY controller to exchange data.

In some implementations, the offset is a specified amount.

In some implementations, a transmission mode of the master PHY controller is set to a first mode during initialization, and wherein establishing the link comprises changing the transmission mode to a second mode from the first mode.

In some implementations, the disclosed embodiments determine whether an LPI mode is enabled in the master PHY controller. The disclosed embodiments further perform operations comprising performing synchronization between the LPI timer of the master PHY controller and the LPI timer of the slave PHY controller in response to determining that the LPI mode is enabled in the master PHY controller. The disclosed embodiments further perform operations comprising establishing the link without synchronizing the LPI timer of the master PHY controller with the LPI timer of the slave PHY controller in response to determining that the LPI mode is disabled in the master PHY controller.

In some implementations, the LPI timer of the master PHY controller is synchronized with the LPI timer of the slave PHY controller by: asserting a master LPI request signal by the master PHY controller; in response to determining at the slave PHY controller that the master LPI request signal has been asserted by the master PHY controller, asserting a slave LPI request signal by the slave PHY controller; and in response to determining at the master PHY controller that the slave LPI request signal has been asserted by the slave PHY controller the operations further comprise: de-asserting the master LPI request signal by the master PHY controller; and setting the LPI timer of the master PHY controller to a first value. The disclosed embodiments further perform operations comprising: in response to determining at the slave PHY controller that the master LPI request signal has been de-asserted by the master PHY controller: de-asserting the slave LPI request signal by the slave PHY controller; and setting the LPI timer of the slave PHY controller to a second value.

In some implementations, the second value is greater than the first value by the offset, the LPI timer of the master PHY controller begins counting responsive to being set to the first value, and the LPI timer of the slave PHY controller begins counting responsive to being set to the second value.

In some implementations, the operations further include performing refresh and quiet operations at the master PHY controller and the slave PHY controller according to the LPI timers of the master PHY controller and the slave PHY controller.

In some implementations, the operations further include: adapting echo canceler coefficients of the master PHY controller during the refresh operations at the master PHY controller while the slave PHY controller trains a channel equalizer of the slave PHY controller; and adapting echo canceler coefficients of the slave PHY controller during the refresh operations at the slave PHY controller while the master PHY controller trains a channel equalizer of the master PHY controller.

In some implementations, performing the refresh and quiet operations comprises cycling between the refresh and quiet operations, and the operations further include preventing the master PHY controller from performing refresh operations at the same time as the slave PHY controller.

In some implementations, the operations further include controlling transitions between the quiet and refresh operations as a function of symbol periods, and the first and second values are defined as a function of the symbol periods.

In some implementations, the operations further include setting a transmission mode of the master PHY controller to a silent or disabled state when the master PHY controller is performing quiet operations. In some implementations, the operations further include setting a transmission mode of the master PHY controller to an idle state when the master PHY controller is performing refresh operations.

In some implementations, the operations further include controlling a transition by the master PHY controller from a sleep state to a quiet or refresh state as a function of a symbol period.

In some implementations, the offset comprises symbol periods corresponding to 3000 microseconds.

This overview is intended to provide an overview of subject matter of the present patent application. It is not intended to provide an exclusive or exhaustive explanation of the inventive subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

BACKGROUND

Figure 1:
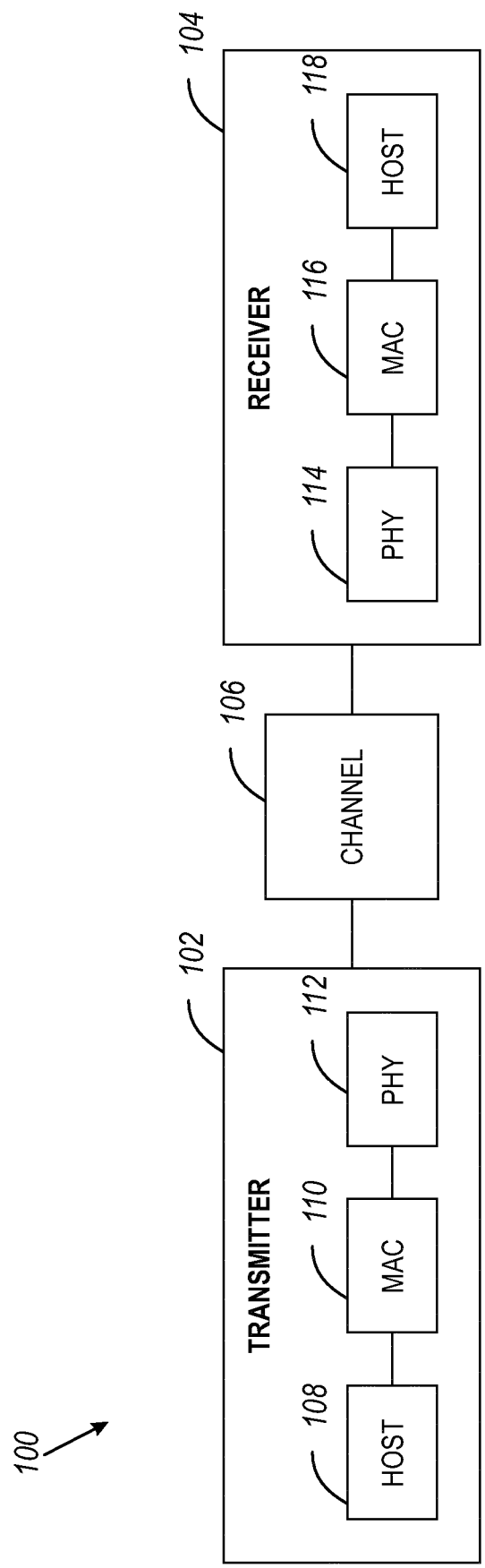
FIG. 1 is a block diagram of an example system in accordance with various embodiments.

Ethernet communications use a Physical Layer (PHY) device to exchange data. Energy Efficient Ethernet (EEE) defines a standard for performing energy efficiency Ethernet communications. EEE uses the LPI mode to reduce the energy consumption of an Ethernet link. In the LPI mode, data is transmitted in the active state and the link enters the LPI state when no data is being sent. In the idle state, short refresh signals are periodically sent to keep the link alive and to align the receivers with current link conditions.

DETAILED DESCRIPTION

This disclosure describes, among other things, techniques to synchronize LPI modes at PHY receivers. LPI is a mode of the IEEE 802.3 standard that is used when a link is idle or not being used to power down or turn off unused circuits of the PHY receiver. The LPI mode uses refresh operations to maintain coefficients and keep a link between two devices alive; sleep operations are used to keep the non-essential circuits shut down during the LPI mode in an LPI QUIET state; and wake operations are used to wake up and power the circuits to enable communications to resume between the two devices. In order to reduce lag and increase efficiency, the time to wake up a given device and the time it takes a given device to go to sleep needs to be kept to a minimum, as does the frequency with which the link is refreshed using the refresh operations.

Typical systems provide different methods for handling LPI modes in the IEEE 802.3 PHY standards after a link is established between two devices. For example, 1000BASE-T specifies a symmetric LPI scheme, where the two PHY devices can only enter LPI QUIET when both are requesting LPI. 100BASE-TX specifies an asymmetric LPI scheme, where the two PHY devices can enter the LPI QUIET state independently. But such systems fail to synchronize timing between LPI state transitions of the PHY devices, which ends up introducing inefficiencies and lag in the overall system. 10BASE-T1L LPI includes no mechanism to provide a PHY device with clear timing information about when LPI QUIET and REFRESH modes (states) should be entered and exited and may be entered depending on data traffic. Because of the lack of timing information and synchronization, the LPI QUIET modes are entered too late or too soon, which creates inefficiencies in the system.

According to the disclosed embodiments, a master-slave relationship between two devices is used to synchronize LPI mode state transitions between two PHY devices. The disclosed approach uses an LPI request signal (loc_lpi_req, as conveyed from both PHY devices (PHYs) on the link) during the link startup process prior to establishing the link in which data is exchanged. Namely, the LPI QUIET and REFRESH cycling and timing synchronization takes place in advance of the SEND IDLE OR DATA (link-up state). The LPI request signal during the link startup process provides an easily observable transition to which the PHYs synchronize their LPI quiet-refresh cycling. The master and slave devices establish a known offset between when each device enters the respective LPI QUIET and REFRESH state. Based on the known offset, the devices can avoid overlapping refresh and quiet operations in the master and slave devices to control when the respective devices adapt their communication parameters, such as channel equalizer and echo canceller coefficients.

Specifically, each PHY device on the link can enter the LPI QUIET state independently of the other regardless of the mode of the other PHY device. In an embodiment, an offset for performing QUIET and REFRESH operations is established such that the slave and master PHY devices perform QUIET and REFRESH operations at predetermined times in a synchronized manner. To do so, once a given PHY device enters the LPI mode, if the given device is a master device, a QUIET REFRESH cycling initialization timer is set to a first value (e.g., 0 microseconds). If the given device is a slave device, the QUIET REFRESH cycling initialization timer is set to a longer second value (e.g., 3000 microseconds). This offset (the difference between the first and second values) is maintained for the lifetime of the link. Because the QUIET REFRESH cycling initialization timer of each of the two devices was synchronized (e.g., each timer was cleared at substantially the same time or with a negligible difference and each device knows the periods of the quiet and refresh operations of the other device) before the link was established, the master and the slave devices are configured to determine, based on the offset, when each will transition between the QUIET and REFRESH states.

FIG. 1 is a block diagram of an example Ethernet communications system 100 in accordance with various embodiments. Specifically, the system 100 is an illustrative IEEE 802.3 Ethernet communication system. While the disclosed embodiments are discussed with respect to wired IEEE 802.3 Ethernet, the teachings are similarly applicable to any other wired or wireless communication system.

As illustrated, a transmitter 102 communicates with one or more receivers, such as receiver 104, over a communications channel 106. The transmitter 102 and receiver 104 may be embodied in any one of a plurality of devices, including a switch, router, endpoint (e.g., computing device, such as a server, client, VOIP phone, wireless access point, etc.), or the like. The transmitter 102 comprises a host 108, media access control (MAC) 110, and a physical layer device (PHY) 112, while the receiver 104 includes a PHY 114, MAC 116, and host 118.

In general, the hosts 108 and 118 include suitable logic, circuitry, and/or code that may enable operability and/or functionality of the five highest functional layers of an OSI model for data packets that are transmitted over the link. Since each layer in the OSI model provides a service to the immediately higher interfacing layer, the MACs 110 and 116 provide the necessary services to hosts 108 and 118 to ensure that packets are suitably formatted and communicated to the PHYs 112 and 114. The MACs 110 and 116 include suitable logic, circuitry, and/or code that may enable handling of data link layer (Layer 2) operability and/or functionality. The MACs 110 and 116 can be configured to implement Ethernet protocols, such as those based on the IEEE 802.3cg standard, for example. The PHYs 112 and 114 can be configured to handle physical layer requirements, which include, but are not limited to, packetization, data transfer and serialization/deserialization (SERDES) according to the 10BASE-T1L PHY standard of the IEEE 802.3cg standard. Certain embodiments of an Ethernet PHY system that synchronize LPI modes are implemented at the PHY layer, as described further below.

The transmitter 102 and receiver 104 may operate according to one of a plurality of schemes. For instance, one scheme involves the use of an LPI technique. In general, LPI relies on turning the active channel 106 silent when there is nothing to transmit. Energy is thereby saved when the channel 106 (e.g., link) is off. Refresh signals can be sent periodically to enable wake up from the sleep mode.

As used herein, "Ethernet PHY" corresponds to PHY circuitry that complies and/or is compatible with one or more IEEE 802.3™ Ethernet communications protocols. The IEEE 802.3™ Ethernet communication protocol may include, for example, single-lane PHY protocols such as 10GBASE-KX, 10GBASE-KR, etc., and/or multi-lane PHY protocols such as 10GBASE-KX4, 40GBASE-KR4, 40GBASE-CR4, 100GBASE-CR10, 100GBASE-CR4, 100GBASE-KR4, and/or 100GBASE-KP4, etc., and/or 10BASE-T1L or other PHY circuitry that is compliant with the IEEE 802.3™ Ethernet communications protocol and/or compliant with an after-developed communications protocol and/or emerging PHY technology specifications such as 25GBASE-CR and/or 25GBASE-KR, etc.

Each PHY 112 circuitry includes respective transmit circuitry and respective receive circuitry and is configured to transmit data packets and/or frames to a remote device over a channel 106. Receive circuitry is configured to receive data packets and/or frames from another device in the channel 106. Each PHY 112 circuitry may include encoding/decoding circuitry (not shown) configured to perform analog-to-digital and digital-to-analog conversion, encoding and decoding of data, analog parasitic cancellation (for example, cross talk cancellation), and recovery of received data.

Figure 2A:
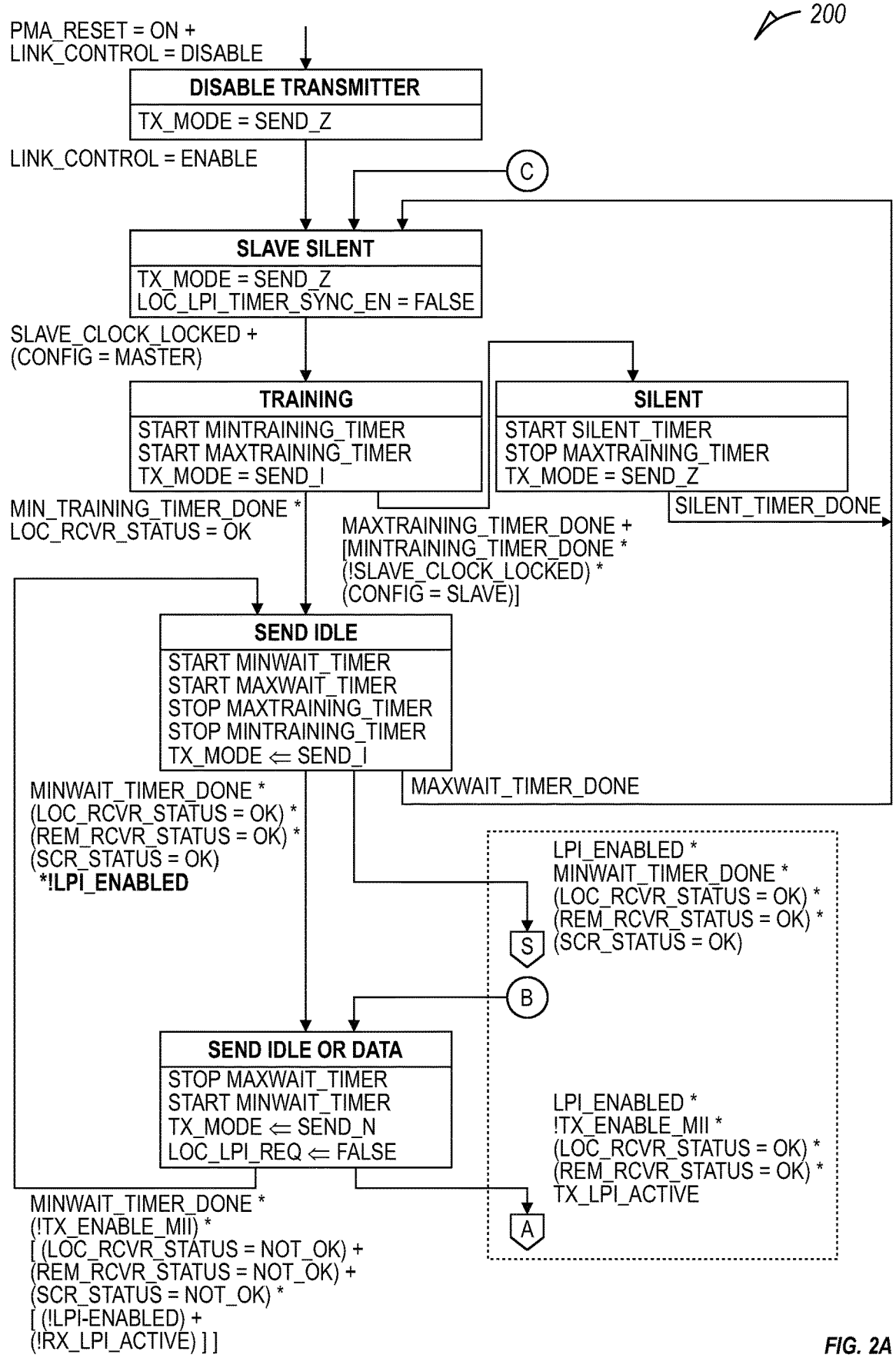
FIG. 2A illustrates an example PHY control state diagram according to the disclosed embodiments.

PHY LPI mode synchronization is performed according to the disclosed embodiments as follows:

The PHY Control state diagram, shown in FIG. 2A, includes an LPI synchronization mechanism that uses a local LPI request signal (loc_lpi_req signal), in advance of establishing the link to exchange data (e.g., prior to entering the SEND IDLE OR DATA states (link-up state)). The LPI synchronization mechanism dictates when a new LPI QUIET REFRESH timing state machine starts (shown and described in connection with FIG. 4A, and specifically states 403 and 404) and specifically synchronizes the LPI initialization timers (lpi_init_timer) of each link partner (the master and the slave devices). Start of LPI QUIET REFRESH timing is communicated to the link partner using the loc_lpi_req signal, which is observed in the link partner (e.g., received by the link partner) as a remote LPI request signal (rem_lpi_req signal). The LPI QUIET REFRESH timing state machine starts (e.g., the lpi_init_timer is synchronized to start) at the same time as a transition in the value of loc_lpi_req signal (e.g., a transition from TRUE to FALSE). In this way a PHY implementation should know when the link partner LPI QUIET REFRESH cycling starts, as well as when its own LPI QUIET REFRESH cycling starts. The LPI QUIET REFRESH timing state machine remains active for the lifetime of the link.

In an embodiment, the LPI QUIET REFRESH timing synchronizes to the symbol timer (TX_TCLK), and because the SLAVE PHY maintains timing lock with the MASTER PHY, the LPI QUIET REFRESH cycle timing also remains fixed for the lifetime of the link. The LPI QUIET REFRESH timing state machine may include an initial delay offset, to introduce a permanent offset between LPI QUIET REFRESH cycles of the two PHYs on the link (e.g., between MASTER and SLAVE).

A PHY implementation could take advantage of LPI synchronization to know when the link partner PHY is in the REFRESH state, and can restrict channel equalizer coefficient adaptation to only be active during this window. A PHY implementation could take advantage of LPI synchronization to know when the local PHY is in the REFRESH state, and can restrict echo canceller coefficient adaptation to only be active during this window.

According to some embodiments, the PHY standard can also reduce the LPI sleep timer duration, the time from when LPI request is initially flagged until when transmission ceases (entry into QUIET).

Without a scheme for LPI QUIET REFRESH synchronization the PHY standard would have to provide for a longer LPI sleep time duration in order to allow any ongoing filter or timing adaptation to complete before reception of idle signaling ceases. This concern is addressed by the disclosed synchronized LPI scheme because the PHYs align all adaptation to the appropriate LPI QUIET REFRESH cycle, which reduces the LPI sleep timer and has the effect of improving energy savings, as the QUIET state is entered sooner.

FIG. 2A illustrates an example PHY control state diagram according to the disclosed embodiments. As shown, the state labeled 'S' is used to begin LPI timing synchronization between a master and a slave PHY device after the SEND IDLE state and before the SEND IDLE OR DATA STATE is entered (e.g., before the link is up between two devices and before the two devices begin exchanging data). The PHY control state diagram begins in the DISABLE TRANSMITTER state in which the transmission mode (tx_mode) of the PHY transmitter is set to the SEND_Z (send zero data) mode. When the link_control signal is enabled to start establishing a link between two devices, the PHY control state diagram transitions to the SLAVE SILENT state. In the SLAVE SILENT state, the tx_mode of the PHY transmitter is set to the SEND_Z mode (sending an idle transmission pattern or data) and the local LPI timer synchronization enable signal (loc_lpi_timer_sync_en signal) is set to false. When the slave clock signal is locked or if the PHY controller is configured as the master device, the PHY control state diagram transitions to the TRAINING state. In the TRAINING state, the tx_mode of the PHY transmitter is set to the SEND_I mode (send an idle transmit pattern). If the PHY device is configured as the slave device and the slave clock is still not locked, the tx_mode of the PHY device remains in the SEND_Z mode until the slave clock is locked. The PHY control state diagram transitions to the SEND IDLE state from the TRAINING state in which the tx_mode is set to the SEND_I mode.

In the SEND IDLE state, the PHY device determines if the LPI mode is enabled based on the lpi_enabled signal. If the LPI mode is disabled, the PHY control state diagram transitions to the SEND IDLE OR DATA state in which the link is up and established and ready to exchange data. In the SEND IDLE OR DATA state, the transmission mode of the transmitter is set to the SEND_N mode and the local LPI request signal (loc_lpi_req signal) is set to false. The PHY device remains in this state while the receiver status is proper (receiver does not have a signal quality issue). When the local or remote receiver status has a signal quality issue, the PHY control state diagram transitions back to the SEND IDLE state in which the transmitter mode is switched to the SEND_I mode and the receivers are re-trained. When, in the SEND IDLE OR DATA state, if the LPI mode is enabled (e.g., the lpi_enabled signal is TRUE) and an indication is received that the upper layers have asserted LPI (e.g., the TX_LPI_ACTIVE signal is TRUE), the PHY control state diagram transitions to the LPI mode to perform the QUIET REFRESH cycling shown in FIG. 5. At the completion of the QUIET REFRESH cycling shown in FIG. 5 and an indication is received that the upper layers have de-asserted LPI (e.g., when the TX_LPI_ACTIVE is FALSE), the PHY control state diagram transitions back to the SEND IDLE or DATA state. Specifically, the LPI QUIET REFRESH timing state diagram (shown and described in connection with FIG. 5) is only activated and entered on the basis of the lpi_enabled signal being set to TRUE.

Referring back to the SEND IDLE state, if the LPI mode is enabled, the PHY control state diagram transitions from the SEND IDLE state to the "S" state to begin LPI timing synchronization between the master and slave PHY devices prior to establishing the link in the SEND IDLE OR DATA state. An lpi_enabled signal (local LPI timer synchronization enable signal) is used to control whether local LPI synchronization is performed. Specifically, when the lpi_enabled signal is set to TRUE, the disclosed embodiments enable LPI synchronization, whereas when the lpi_enabled signal is set to FALSE, the disclosed embodiments prevent LPI synchronization. The operations and state transitions performed in the S state are described in connection with FIG. 3A.

Figure 2B:
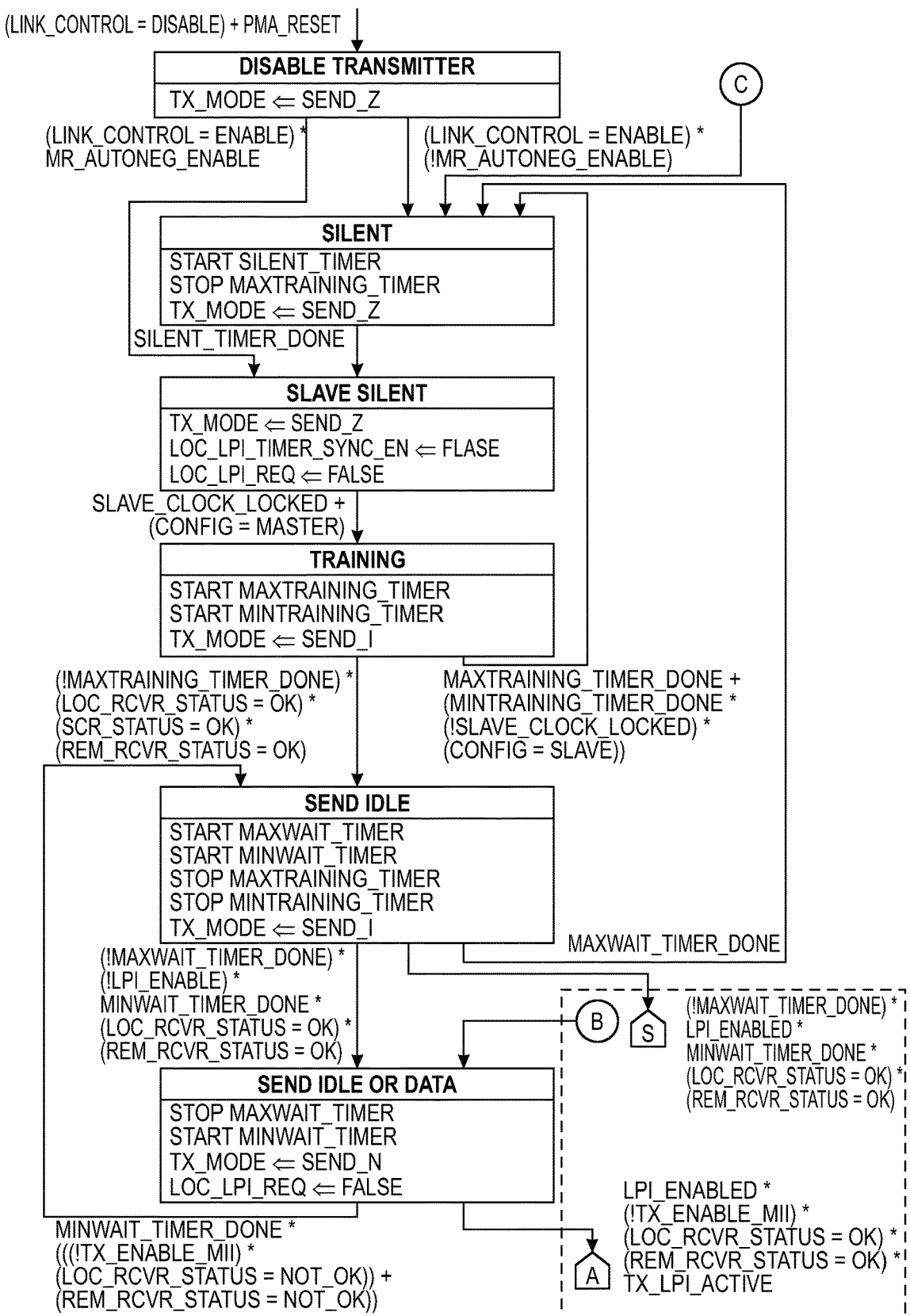
FIG. 2B illustrates another example PHY control state diagram according to the disclosed embodiments.

FIG. 2B shows another example of the PHY control state diagram according to the disclosed embodiments. All of the operations shown and discussed in connection with FIG. 2A are similarly applicable in FIG. 2B.

Figure 3A:
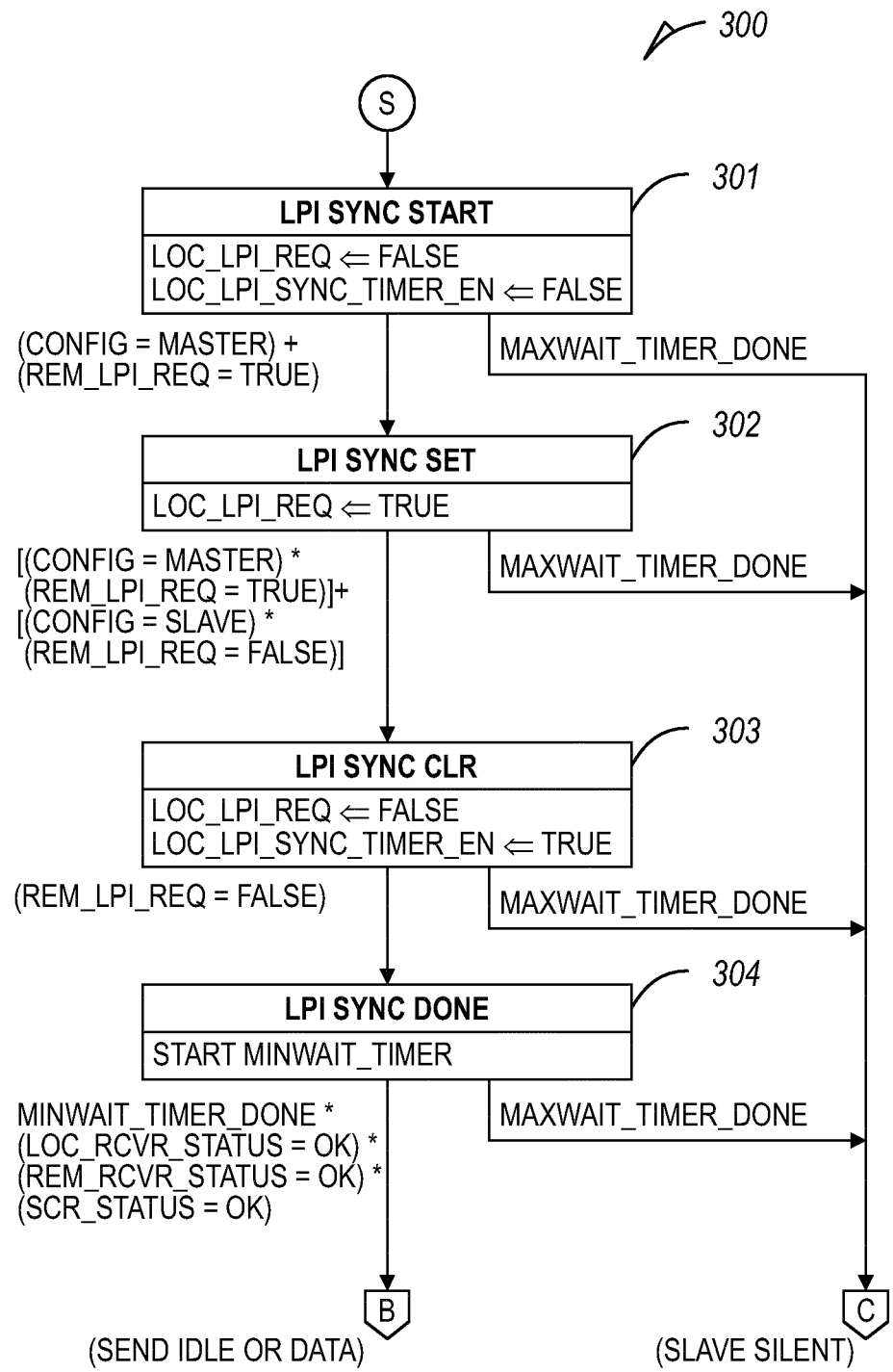
FIG. 3A illustrates an example PHY control LPI synchronization diagram according to the disclosed embodiments.

FIG. 3A illustrates an example PHY control LPI synchronization diagram 300 according to the disclosed embodiments. According to the disclosed embodiments, the PHY device transitions from the SEND IDLE state (shown in FIGS. 2A and 2B) to the PHY control LPI synchronization diagram 300 on the basis of an lpi_enabled signal being set to TRUE (as well as other upper layer indications). In such cases, the LPI synchronization sequence is performed as follows in states 301, 302, 303 and 304.

At state 301, the master PHY device determines whether the configuration bit for the master PHY device indicates whether the PHY device is a master or slave device. If the PHY device determines it is configured as a master device, the master PHY device immediately transitions to state 302 from state 301 and sets the loc_lpi_req signal (local LPI request signal) to TRUE. If the PHY device determines it is configured as a slave device, the slave PHY device waits for an LPI request signal that is TRUE to be received from the master PHY device (observed as rem_lpi_req signal being TRUE). Each device knows if it is the slave or master based on a previously stored configuration bit that is set while establishing the link. In this way, the slave PHY device waits in state 301 for a rem_lpi_req signal (remote LPI request signal) to be set to TRUE. For example, the slave PHY device waits to receive a rem_lpi_req signal that is TRUE from the master PHY device which takes place when the master PHY device sets the loc_lpi_req signal to TRUE in state 302. Specifically, when the master PHY device sets the loc_lpi_req signal to TRUE in state 302, the slave PHY device observes this signal as a rem_lpi_req signal becoming TRUE. At that point, the slave PHY device also transitions to state 302 in which the slave PHY device sets its own loc_lpi_req signal to TRUE.

The master PHY device waits in state 302 to receive the rem_lpi_req signal that is TRUE from the slave device which takes place when the slave PHY device sets its loc_lpi_req signal to TRUE. At that point the master PHY device transitions to state 303. The slave PHY device waits in state 302 to receive a signal indicating that the master PHY device set the loc_lpi_req signal to FALSE. When the slave PHY device determines that the loc_lpi_req signal of the master has been set to FALSE by observing the rem_lpi_req signal becoming FALSE, the slave PHY device transitions to state 303.

In state 303, each PHY device sets its loc_lpi_req signal to FALSE. The master PHY device first enters this state 303 before the slave PHY device. Upon entering this state, the master PHY device sets the loc_lpi_req signal to FALSE which then triggers the slave PHY device to also enter state 303 and set its own loc_lpi_req signal to FALSE. The master PHY device also sets the loc_lpi_sync_time_en (local LPI synchronization timer enable) to TRUE at the same time. As described in connection with FIG. 4A, this loc_lpi_sync_time_en is not encoded in the transmit symbol stream and does not require new communicated parameters to be exchanged. This loc_lpi_sync_time_en activates the LPI QUIET REFRESH operations.

Referring back to FIG. 3A, the slave PHY device waits to receive the rem_lpi_req that is FALSE from the master PHY device. At that point, the slave PHY device sets its loc_lpi_req to FALSE. The slave also sets the loc_lpi_sync_timer_en to TRUE at the same time as transitioning the loc_lpi_req from TRUE to FALSE. In this way, in both the master and the slave PHY devices, the transition of the loc_lpi_req signal from TRUE to FALSE occurs substantially at the same time as starting the local LPI synchronization timing (e.g., loc_lpi_sync_timer_en transitions from FALSE to TRUE). Also, the transition to state 303 to start the local LPI synchronization timing synchronizes the LPI timers of the master and slave PHY devices. After the loc_lpi_sync_timer_en transitions from FALSE to TRUE, the master and PHY devices transition to state 304 where synchronization is complete.

Figure 3B:
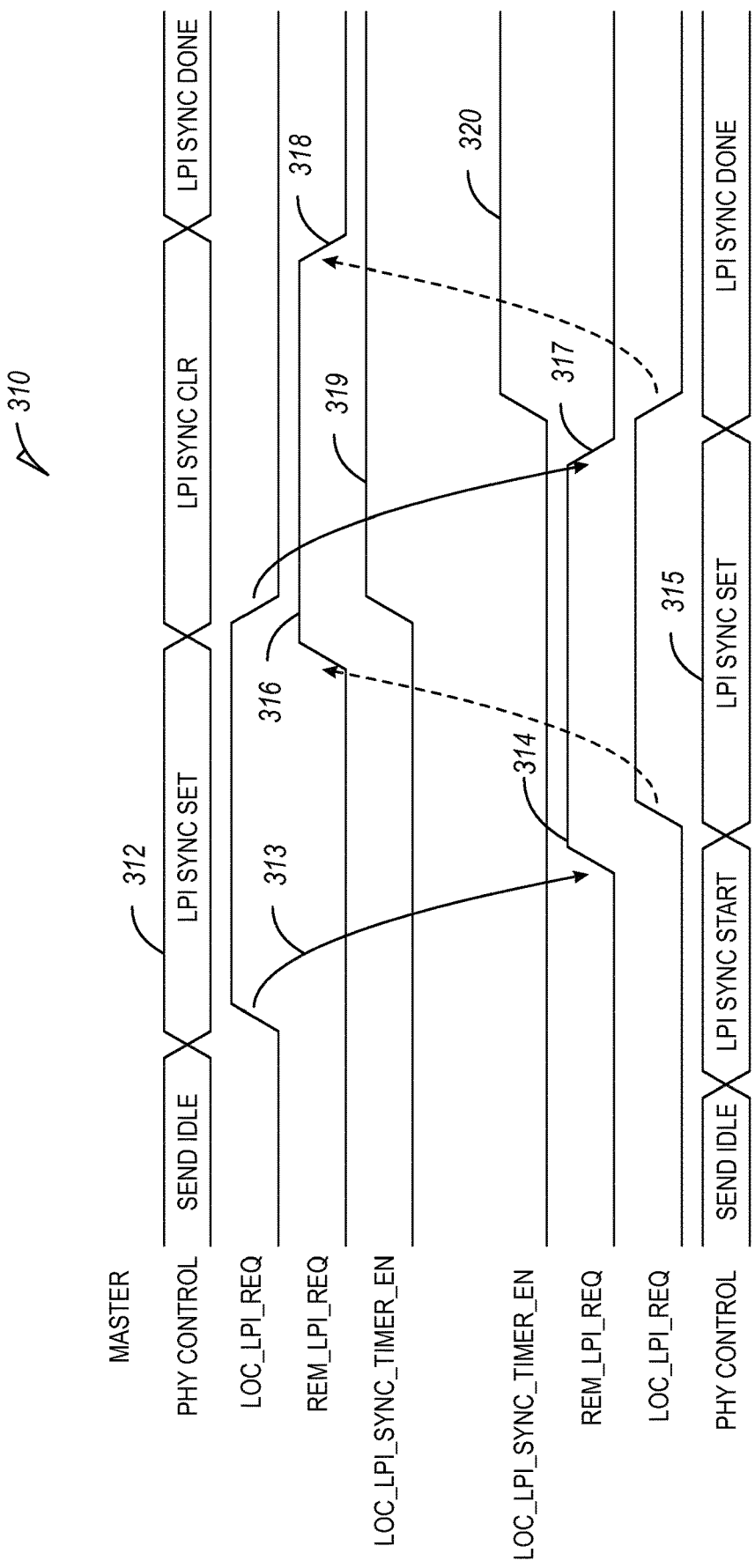
FIG. 3B illustrates an example timing diagram of the state transitions shown and described in connection with FIG. 3A according to the disclosed embodiments.

FIG. 3B illustrates an example timing diagram 310 of the state transitions shown and described in connection with FIG. 3A according to the disclosed embodiments. As shown in FIG. 3B, initially, a slave PHY device is in the SEND IDLE state. From this state, the slave PHY device transitions to the LPI SYNC START state, where the slave PHY device awaits assertion of rem_lpi_req signal. The rem_lpi_req will assert in response to the master PHY device asserting its loc_lpi_req signal.

Specifically, as shown, initially, a master PHY device (shown in the top portion of the diagram 310) is in the SEND IDLE state (FIGS. 2A and 2B). From this state, the master PHY device transitions to the LPI SYNC SET state 312 after determining that the PHY device is configured as a master device. The master PHY device asserts (sets to TRUE) the loc_lpi_req signal. The slave PHY device receives an indication 313 that the master PHY device asserted the loc_lpi_req signal when the rem_lpi_req signal 314 at the slave PHY device is asserted.

In response to the rem_lpi_req signal 314 becoming asserted, the slave PHY device transitions to the LPI SYNC SET state 315 and asserts the loc_lpi_req. The master PHY device receives an indication that the slave PHY device asserted the loc_lpi_req of the slave PHY device when the rem_lpi_req signal 316 at the master PHY device is asserted. In response to the rem_lpi_req signal 316 at the master PHY device becoming asserted, the master PHY device transitions to the LPI SYNC CLR state and de-asserts (sets to FALSE) the loc_lpi_req signal of the master PHY device. The master PHY device at the same time as de-asserting the loc_lpi_req signal asserts the loc_lpi_sync_time_en signal 319. The slave PHY device receives an indication that the loc_lpi_req of the master PHY device has been de-asserted by receiving a signal that de-asserts the rem_lpi_req signal 317 of the slave PHY device. In response, the slave PHY device transitions to the LPI SYNC CLR state and also de-asserts the loc_lpi_req signal of the slave PHY device and asserts the loc_lpi_sync_time_en signal 320 of the slave PHY device. The slave PHY device proceeds immediately on to the LPI SYNC DONE state. When the slave PHY device de-asserts the loc_lpi_req signal, the rem_lpi_req signal 318 becomes de-asserted at the master PHY device, which causes the master PHY device to enter the LPI SYNC DONE state. Once both the master and the slave PHY devices enter the LPI SYNC DONE states, their respective LPI timers are synchronized. In some cases, the de-asserting of loc_lpi_req signal, and consequently the asserting of loc_lpi_sync_time_en signal 319/320, the triggers the respective LPI timer of the master and slave PHY device to begin counting up or down to a specified value.

As shown in FIG. 3A, the MAX_WAIT_TIMER_DONE signal controls via path 'C' when any of the states transition back to either the SLAVE SILENT state (FIG. 2A) in one embodiment or to the SILENT state (FIG. 2B). Specifically, expiration of the MAX_WAIT_TIMER when performing operations of FIG. 3A causes the PHY device to transition directly back to the SLAVE SILENT state of FIG. 2A in one embodiment. In another embodiment, expiration of the MAX_WAIT_TIMER when performing operations of FIG. 3A causes the PHY device to transition directly back to the SILENT state of FIG. 2B.

Figure 4A:
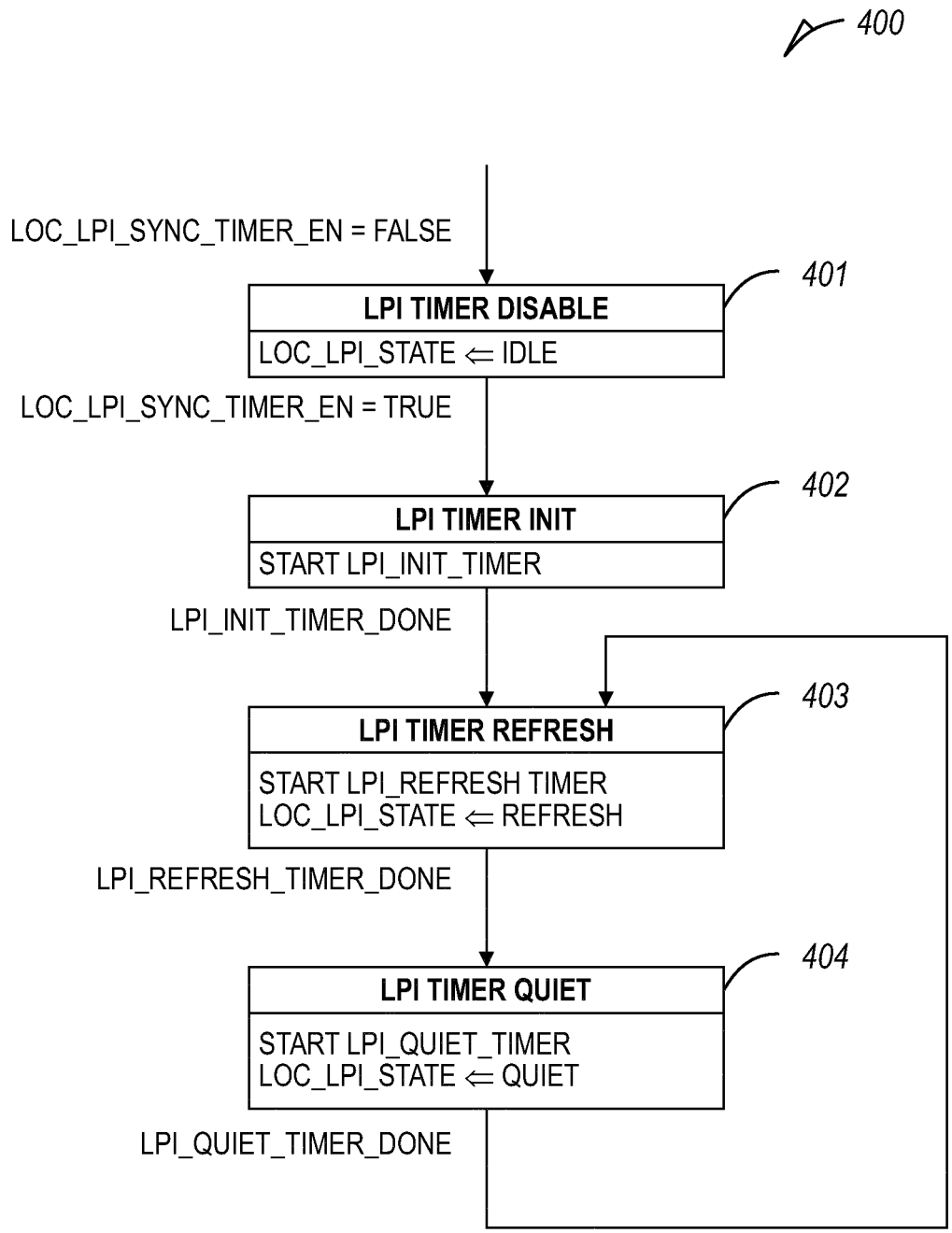
FIG. 4A illustrates an example LPI QUIET REFRESH timing state diagram according to the disclosed embodiments.

FIG. 4A illustrates an example LPI QUIET REFRESH timing state diagram 400 according to the disclosed embodiments. In an example, the slave and master PHY devices are initially at the LPI TIMER DISABLE state 401 and do not perform QUIET and REFRESH operations until the loc_lpi_sync_timer_en signal is set to TRUE. This may take place after the slave and master PHY devices each enter the LPI SYNC CLR state 303. For the slave PHY device this is a transient state (0 dwell time) because the condition to exit this state (rem_lpi_req=TRUE) is the same as the condition to enter the state from the LPI SYNC SET state. When each of the slave and master PHY devices enters an LPI TIMER INIT state 402 the respective devices start respective LPI timers (lpi_init_timer). Because the slave and master PHY devices enter the LPI TIMER INIT state 402 in a predictable manner and substantially at the same time as each other (e.g., when they respectively transition the loc_lpi_req signal from TRUE to FALSE (and consequently when the respective LOC_LPI_SYNC_TIMER_EN signal is asserted) substantially at the same time or within a negligible difference in time), the lpi_init_timers of the master and PHY devices are synchronized. There is synchronization between loc_lpi_req signal transitioning from TRUE to FALSE (which is observable to the link partner PHY) and loc_lpi_sync_time_en signal assertion, which triggers the LPI QUIET REFRESH state machine (which is internal to the PHY device, and not directly observable to the link partner PHY). This applies for both master and slave PHY devices.

In an embodiment, the LPI TIMER INIT state 402 creates an offset between the master and slave which controls when they each perform REFRESH and QUIET operations. For example, the master and slave PHY devices can be configured with different timer values in the LPI TIMER INIT state. Specifically, the master PHY device can be configured to initialize (set) its timer to have a duration of 0 microseconds while the slave PHY device can be configured to initialize its timer to have a duration of 3000 microseconds. This offset can be maintained for the lifetime of the link because of the timing relationship between the PHY devices. The slave PHY device recovers timing from the master PHY device signaling, and uses this to time its own transmit signaling. Both PHY devices use scrambled idle signaling (as defined in IEEE standard), and each descrambles the signals of the other. When the timers are set to the specified durations, the timers begin counting up or down until the specified duration or value is reached.

After the lpi_init_timer expires at the slave and master PHY devices respectively, the PHY devices transition to the LPI TIMER REFRESH state 403 in which an lpi_refresh_timer is started which may have a value of 250 microseconds to perform refresh operations and in which the loc_lpi_state is set to REFRESH. Because of the offset established between the slave and master PHY controllers by setting different values for the lpi_init_timers at the respective devices, the master PHY controller is prevented from performing refresh operations at the same time as the slave PHY controller. Namely, the master PHY controller enters the LPI TIMER REFRESH state 403 before the slave PHY controller and completes performing REFRESH operations (e.g., when the lpi_refresh_timer reaches a threshold) before the lpi_init_timer of the slave PHY controller reaches the offset value (e.g., 3000 microseconds) at which point the PHY controller enters the LPI TIMER REFRESH state 403.

After the lpi_refresh_timer expires, the respective PHY devices transition to the LPI TIMER QUIET state 404 to perform quiet operations and in which the loc_lpi_state is set to QUIET. The transmission mode of the master PHY controller is prevented from being set to a silent or disabled state when the master PHY controller is performing quiet operations. Specifically, the loc_lpi_state being set to QUIET allows the transmission mode (tx_mode) to be silent/disabled. This is governed by the PHY control state diagram. In the context of the LPI link-up operation, tx_mode becomes SEND_Z (silent/disabled) given two conditions: loc_lpi_state being set to quiet and the PHY control state machine being in the LPI QUIET REFRESH state.

The LPI TIMER QUIET state 404 can start an lpi_quiet_timer with a value of 6000 microseconds, and when this timer expires, the respective PHY devices return to the LPI TIMER REFRESH state 403. In an embodiment, all timers can be synchronized to the symbol period (TX_TCLK) and can be defined in terms of symbol periods. As the slave PHY device maintains timing lock with the master PHY device, timing relationship between the master and slave LPI QUIET REFRESH cycling remains fixed and predictable. The loc_lpi_state being in the REFRESH or QUIET state controls the transition between states discussed in connection with FIG. 5 to adapt the transmission mode (tx_mode) of the PHY devices.

In some cases, the echo canceler coefficients of the master PHY controller are adapted during the REFRESH operations that are performed at the master PHY controller while the slave PHY controller trains a channel equalizer of the slave PHY controller. The echo canceler coefficients of the slave PHY controller are adapted during the REFRESH operations that are performed at the slave PHY controller while the master PHY controller trains a channel equalizer of the master PHY controller.

Figure 4B:
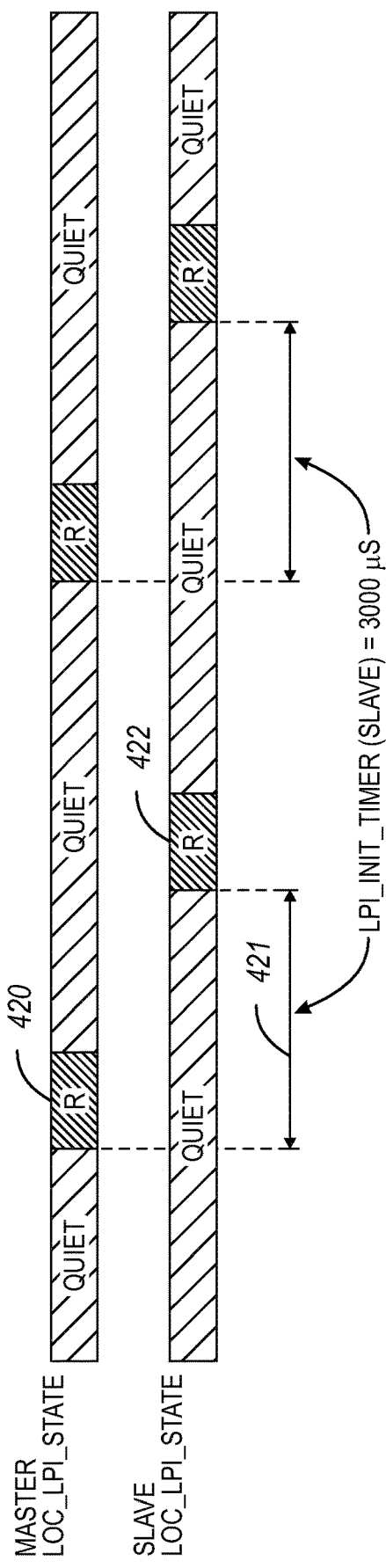
FIG. 4B illustrates an example timing diagram of the state transitions of FIG. 4A in accordance with the disclosed embodiments.

FIG. 4B illustrates an example timing diagram of the state transitions of FIG. 4A in accordance with the disclosed embodiments. As shown in FIG. 4B, the 3000 microsecond offset 421 created at the LPI TIMER INIT state 402 ensures a predetermined cycle between when each PHY device performs the quiet and refresh operations 420 and 422, respectively. Namely, the quiet and refresh operations 420 at the master PHY device are performed at the established predetermined offset value (e.g., 3000 microseconds) relative to when such operations 422 are performed by the slave PHY device. This knowledge of local and remote LPI refresh timing allows PHY implementation that is less complex and enables planning for filter coefficient updates that take place in the refresh state.

Figure 5:
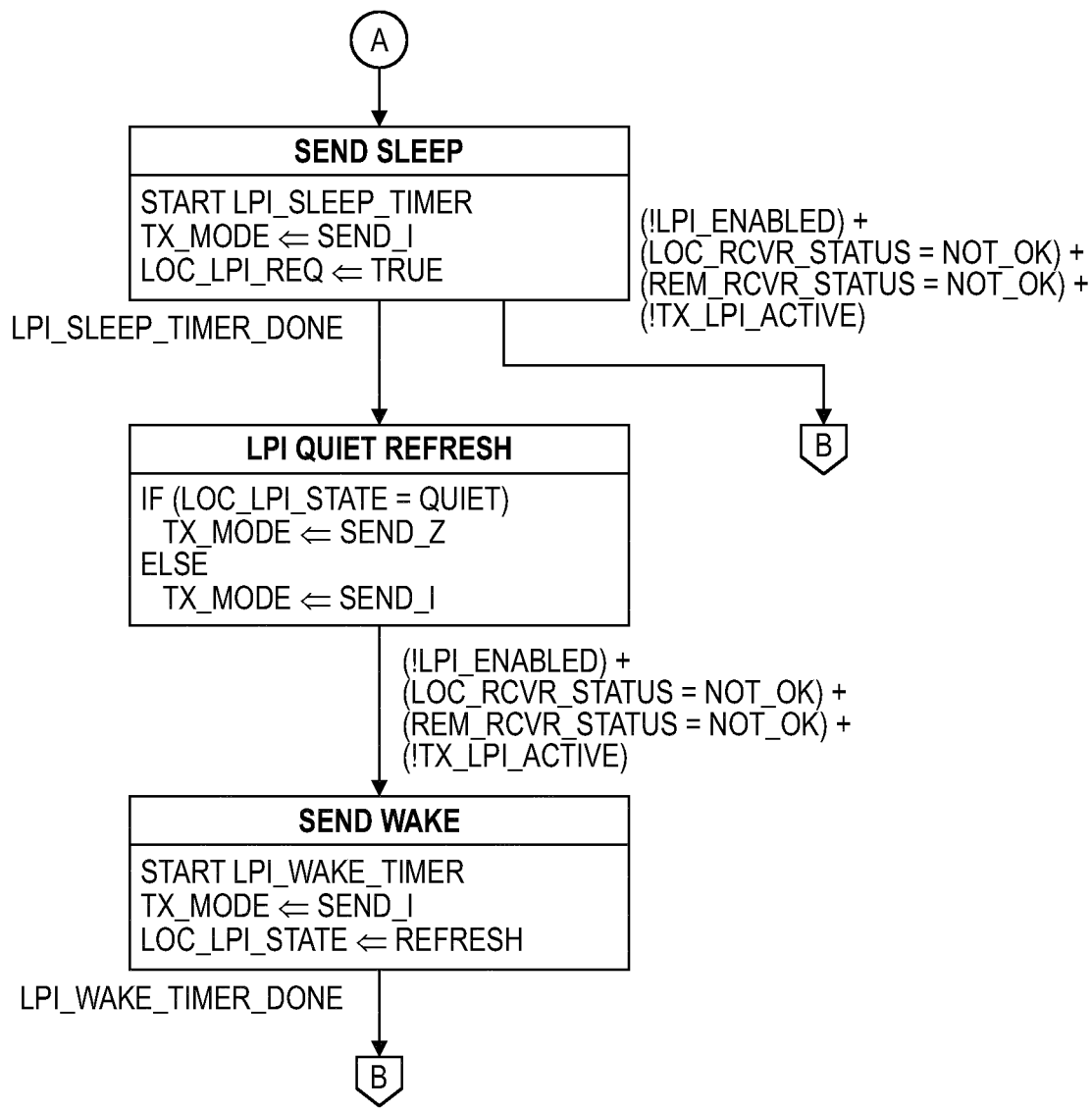
FIG. 5 illustrates an example PHY control LPI sequencing state diagram according to the disclosed embodiments.

FIG. 5 illustrates an example PHY control LPI sequencing state diagram 500 according to the disclosed embodiments. Referring back to FIGS. 2A and 2B, the PHY device performs the operations of the states of FIG. 5 after entering the SEND IDLE OR DATA state. The LPI QUIET/REFRESH is set by the loc_lpi_state variable which is output by the LPI QUIET REFRESH timing state diagram of FIG. 4A. An lpi_sleep_timer is used in a SEND SLEEP state to control when a given PHY device enters the LPI mode or the LPI QUIET REFRESH state. Typically, the lpi_sleep_timer duration (the value of the lpi_sleep_timer in the SEND SLEEP state) is set to a value of 205 microseconds plus or minus 5 microseconds. This long duration allows for ongoing adaptation tasks to complete before transmission ceases in the QUIET state. Given that the link partner LPI QUIET REFRESH cycling is known (e.g., based on the predetermined offset that is created and based on the fact that the cycling is initiated at the same time when both the slave and master PHY devices enter the LPI SYNC DONE state of FIG. 3A), the PHY devices are aligned and do not need such a long duration in the SEND SLEEP state. As such, according to some embodiments, the value of the lpi_sleep_timer in the SEND SLEEP state is set to 20 microseconds or the value of the minwait_timer duration (of the SEND IDLE OR DATA state in FIGS. 2A and 2B). In some cases, this value can be specified in terms of transmit symbol periods. The reduction of the duration of the lpi_sleep_timer provides for improved energy savings as the QUIET state is reached sooner than typical approaches. In some cases, a data traffic pattern which provides a short period of LPI assertion between sending frames can prevent entry to the LPI QUIET state if the period of LPI assertion is less than the lpi_sleep_timer. In some cases, the TX_LPI_ACTIVE signal triggers the PHY device to enter the LPI states of FIG. 5 and the !TX_LPI_ACTIVE triggers the PHY device to exit the LPI states of FIG. 5 and return to the SEND IDEL OR DATA state (FIGS. 2A and 2B).

Figure 6A:
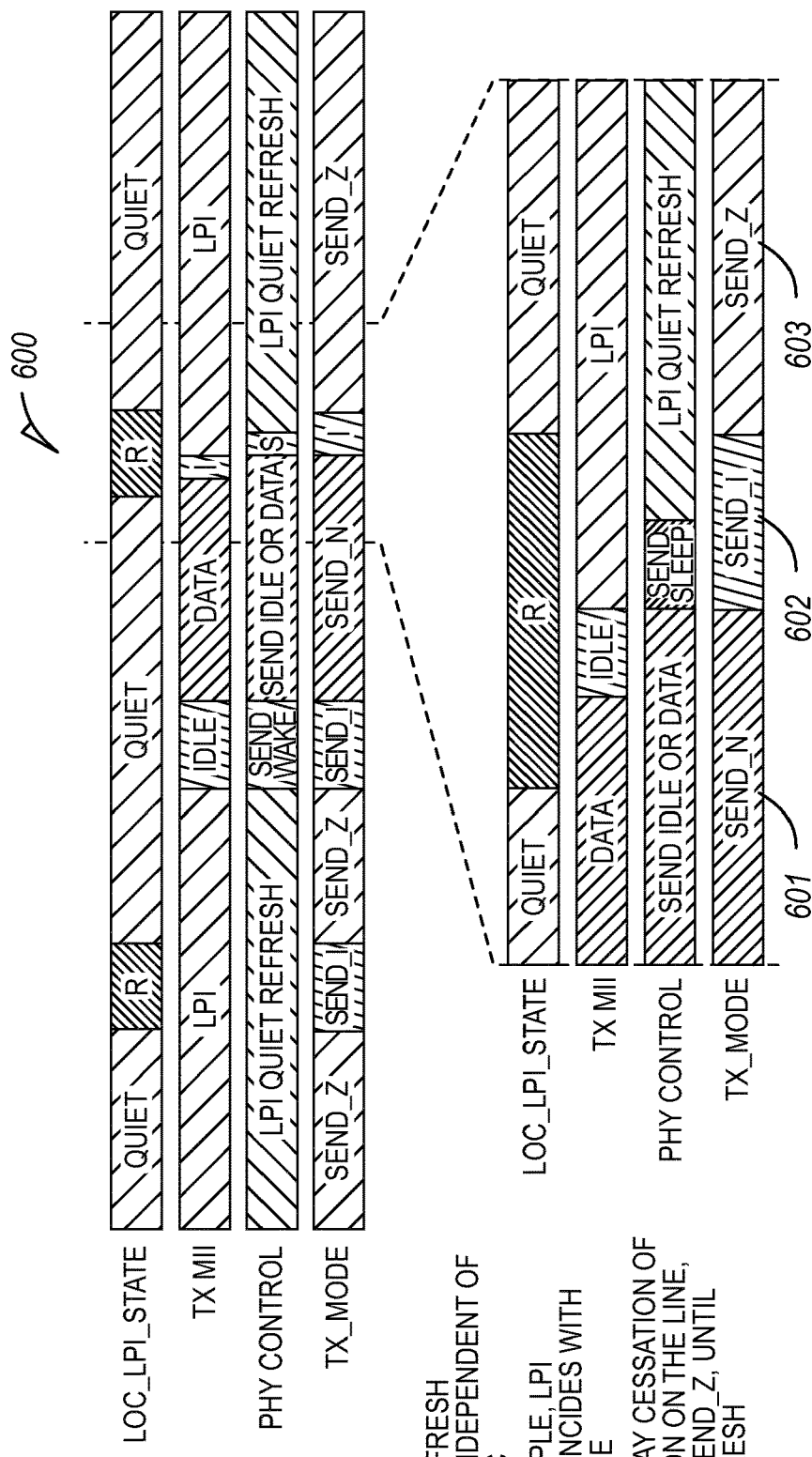
FIG. 6A illustrates an example timing diagram of LPI and frame transmissions in accordance with the disclosed embodiments.

FIG. 6A illustrates an example timing diagram 600 of LPI and frame transmissions in accordance with the disclosed embodiments. Specifically, FIG. 6A shows the change in transmission modes of the PHY receiver between the QUIET and REFRESH states. As shown, in the SEND IDLE OR DATA state (FIGS. 2A and 2B), the tx_mode is set to the SEND_N mode 601 and the TX MII is set to LPI which coincides with TX_LPI_ACTIVE being set to true. From that state, when LPI is enabled (e.g., the TX_LPI_ACTIVE signal is asserted), the PHY controller transitions to the SEND SLEEP state of FIG. 5. In this state, the tx_mode is set to the SEND_I mode 602. When the lpi_sleep_timer reaches the threshold value, if the loc_lpi_state is in the QUIET state, the tx_mode is set to the SEND_Z mode 603. If the loc_lpi_state is in the REFRESH state, the tx_mode is set to the SEND_I mode 602.

FIG. 6A is an example of one case that would occur during LPI operation. As shown in FIG. 6A, the link is in LPI mode, but then a data frame is transmitted. The end of this data frame coincides with a loc_lpi_state being set to the REFRESH state. Here, the tx_mode does not go immediately back to SEND_Z (which it would do otherwise), but it waits and 'services' the REFRESH state operations. The TX MII transitions from LPI, through IDLE, to DATA. This is the data interface from the MAC. The IDLE value here corresponds to the wake-up for LPI mode, and so it corresponds to the SEND WAKE state.

Figure 6B:
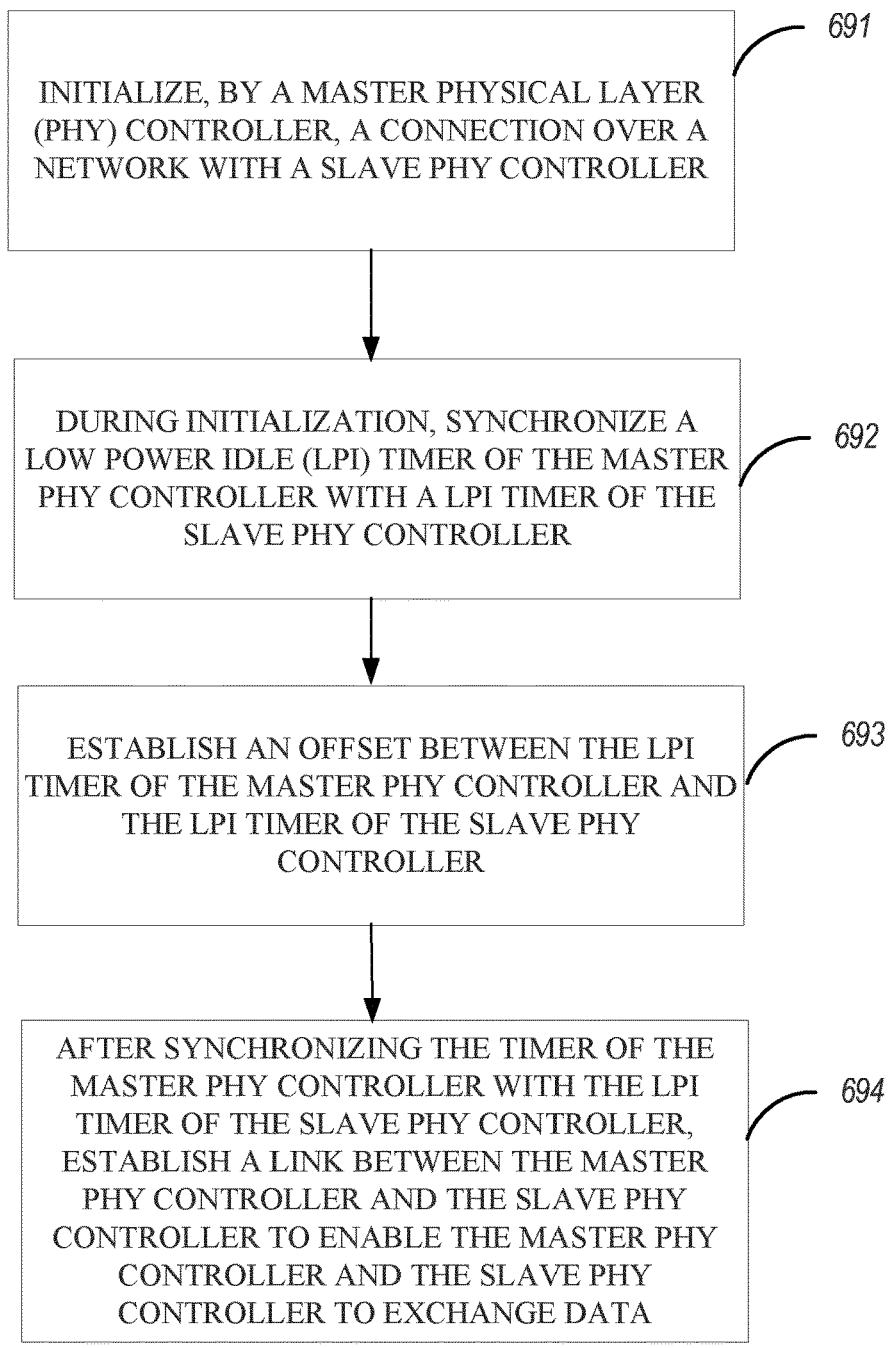
FIG. 6B illustrates an example process for performing LPI synchronization according to the disclosed embodiments.

FIG. 6B illustrates an example process 690 for performing LPI synchronization according to the disclosed embodiments. The process 690 includes various operations that are performed by PHY controllers at a master and slave PHY device. These operations can be stored as non-transitory instructions on non-transitory computer-readable medium that can be executed by a respective processor on the PHY controller.

At operation 691, a master PHY controller initializes a connection over a network with a slave PHY controller. For example, the master PHY controller transitions between the DISABLE TRANSMITTER state, SLAVE SILENT state, TRAINING state, SILENT state, and SEND IDLE states to bring up the link between the master PHY controller and the slave PHY controller.

At operation 692, during initialization, an LPI timer of the master PHY controller is synchronized with an LPI timer of the slave PHY controller. For example, after the SEND IDLE state, if the lpi_enabled bit is asserted (to enable LPI between the two PHY controllers), the PHY controller transitions to the 'S' state to perform operations of FIG. 3A to synchronize the LPI timers of the master and slave PHY controllers.

At operation 693, the PHY controllers establish an offset between the LPI timer of the master PHY controller and the LPI timer of the slave PHY controller. For example, the master PHY controller sets the lpi_init_timer in state 402 to a first value (e.g., 0) and the slave PHY controller sets the lpi_init timer in state 402 to a second value (e.g., 3000 microseconds) to establish the offset 421 between when each PHY controller starts QUIET REFRESH cycling.

At operation 694, after synchronizing the timer of the master PHY controller with the LPI timer of the slave PHY controller, the PHY controllers establish a link between the master PHY controller and the slave PHY controller to enable the master PHY controller and the slave PHY controller to exchange data. For example, the master and slave PHY controllers enter the SEND IDLE OR DATA state (FIGS. 2A and 2B) to establish the link to begin exchanging data.

Figure 7:
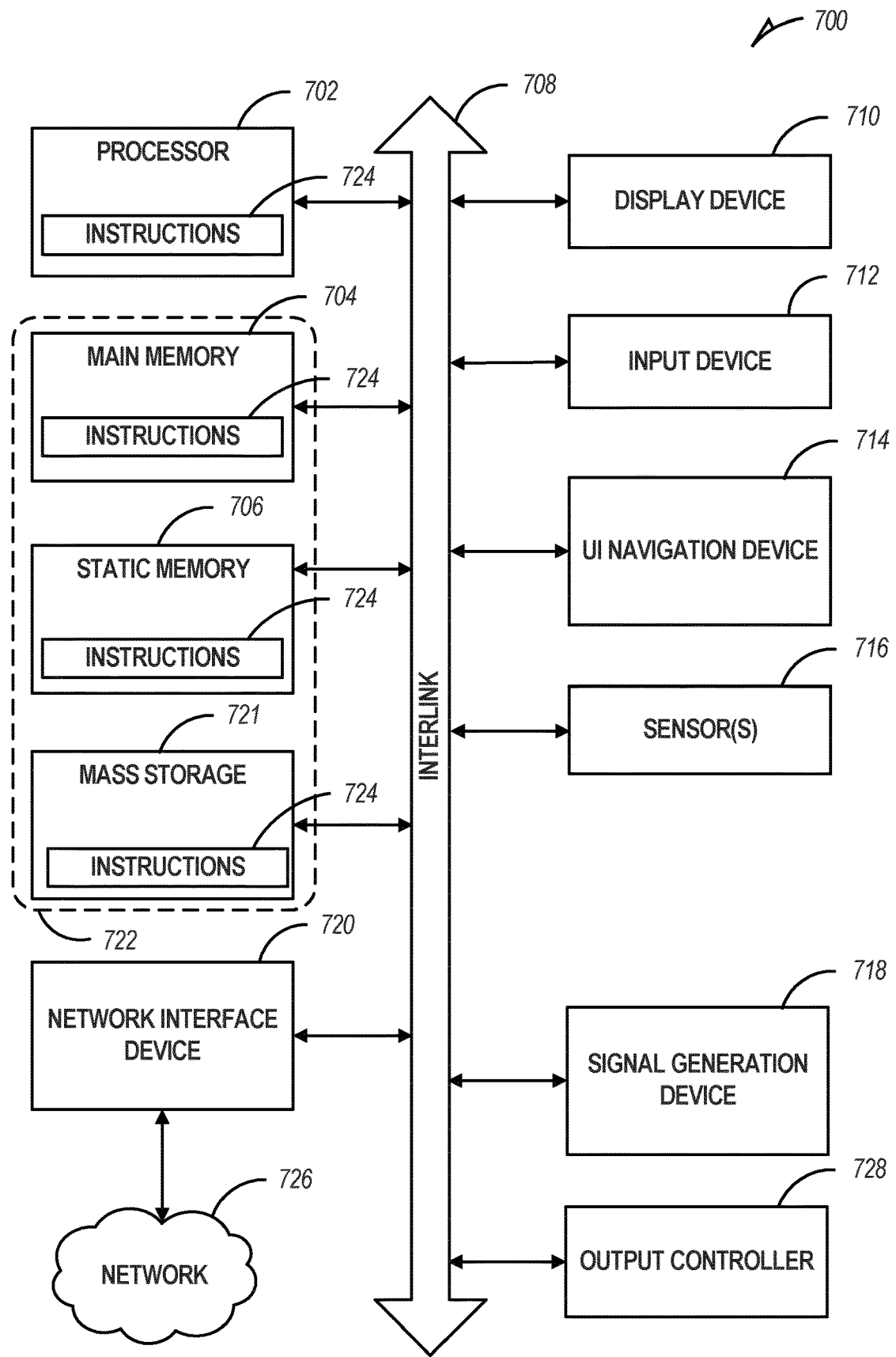
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, an IoT device, automotive system, an aerospace system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 700 may include a hardware processor 702 (e.g., a central processing unit (CPU), a graphics processing unit (GPU), a hardware processor core, or any combination thereof, such as a memory controller, etc.), a main memory 704, and a static memory 706, some or all of which may communicate with each other via an interlink (e.g., bus) 708. The machine 700 may further include a display device 710, an alphanumeric input device 712 (e.g., a keyboard), and a user interface (UI) navigation device 714 (e.g., a mouse). In an example, the display device 710, input device 712, and UI navigation device 714 may be a touch screen display. The machine 700 may additionally include a machine-readable medium 722 (e.g., drive unit), a signal generation device 718 (e.g., a speaker), a network interface device 720, one or more sensors 716, such as a global positioning system (GPS) sensor, wing sensors, mechanical device sensors, temperature sensors, ICP sensors, bridge sensors, audio sensors, industrial sensors, compass, accelerometer, or other sensors. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The machine-readable medium 722 may include a storage device 721 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 721 may constitute the machine-readable medium 722.

While the machine-readable medium 722 is illustrated as a single medium, the term "machine-readable medium" may include a single medium or multiple media (e.g., a centralized or distributed database, or associated caches and servers) configured to store the one or more instructions 724.

The term "machine readable medium" may include any transitory or non-transitory medium that is capable of storing, encoding, or carrying transitory or non-transitory instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 (e.g., software, programs, an operating system (OS), etc.) or other data that are stored on the storage device 721 can be accessed by the memory 704 for use by the processor 702. The memory 704 (e.g., DRAM) is typically fast, but volatile, and thus a different type of storage than the storage device 721 (e.g., an SSD), which is suitable for long-term storage, including while in an "off" condition. The instructions 724 or data in use by a user or the machine 700 are typically loaded in the memory 704 for use by the processor 702. When the memory 704 is full, virtual space from the storage device 721 can be allocated to supplement the memory 704; however, because the storage device 721 is typically slower than the memory 704, and write speeds are typically at least twice as slow as read speeds, use of virtual memory can greatly reduce user experience due to storage device latency (in contrast to the memory 704, e.g., DRAM). Further, use of the storage device 721 for virtual memory can greatly reduce the usable lifespan of the storage device 721.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible or intangible medium that is capable of storing, encoding or carrying instructions for execution by the machine 700, and includes digital or analog communications signals or other tangible or intangible medium to facilitate communication of such software.

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the inventive subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in a aspect are still deemed to fall within the scope of that aspect. Moreover, in the following aspects, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with transitory or non-transitory instructions operable to configure an electronic device to perform methods as described in the above examples. An implementation of such methods may include code, such as microcode, assembly language code, a higher-level language code, or the like. Such code may include transitory or non-transitory computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the aspects. Also, in the above Detailed Description, various features may be grouped together to streamline the disclosure. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments may be combined with each other in various combinations or permutations. The scope of the inventive subject matter should be determined with reference to the appended aspects, along with the full scope of equivalents to which such aspects are entitled.

What is claimed is:

1. A method comprising:
   initializing, by a master physical layer (PHY) controller, a connection over a network with a slave PHY controller;
   during initialization of the connection by the master PHY controller with the slave PHY controller and prior to initially establishing a link between the master PHY controller and the slave PHY controller in which data is exchanged in a send idle or data state, synchronizing a low power idle (LPI) timer of the master PHY controller with a LPI timer of the slave PHY controller, the LPI timers of the master PHY controller and the slave PHY controllers configured to control when the master PHY controller and the slave PHY controllers start cycling refresh and quiet operations;
   establishing an offset between the LPI timer of the master PHY controller and the LPI timer of the slave PHY controller; and
   after synchronizing the timer of the master PHY controller with the LPI timer of the slave PHY controller, establishing the link between the master PHY controller and the slave PHY controller to enable the master PHY controller and the slave PHY controller to exchange the data.

2. The method of claim 1, wherein the offset is a specified amount, and wherein the LPI timer of the master PHY controller is synchronized with the LPI timer of the slave PHY controller before the master PHY controller and the slave PHY controller enter a low power idle (LPI) mode.

3. The method of claim 1, wherein a transmission mode of the master PHY controller is set to a first mode during initialization, and wherein establishing the link comprises changing the transmission mode to a second mode from the first mode.

4. The method of claim 1, further comprising determining whether an LPI mode is enabled in the master PHY controller.

5. The method of claim 4, further comprising performing synchronization between the LPI timer of the master PHY controller and the LPI timer of the slave PHY controller in response to determining that the LPI mode is enabled in the master PHY controller.

6. The method of claim 4, further comprising establishing the link without synchronizing the LPI timer of the master PHY controller with the LPI timer of the slave PHY controller in response to determining that the LPI mode is disabled in the master PHY controller.

7. The method of claim 1, wherein synchronizing the LPI timer of the master PHY controller with the LPI timer of the slave PHY controller comprises:
asserting a master LPI request signal by the master PHY controller;
in response to determining at the slave PHY controller that the master LPI request signal has been asserted by the master PHY controller, asserting a slave LPI request signal by the slave PHY controller; and
in response to determining at the master PHY controller that the slave LPI request signal has been asserted by the slave PHY controller:
de-asserting the master LPI request signal by the master PHY controller; and
setting the LPI timer of the master PHY controller to a first value.

8. The method of claim 7, further comprising:
in response to determining at the slave PHY controller that the master LPI request signal has been de-asserted by the master PHY controller:
de-asserting the slave LPI request signal by the slave PHY controller; and
setting the LPI timer of the slave PHY controller to a second value.

9. The method of claim 8, wherein the second value is greater than the first value by the offset, wherein the LPI timer of the master PHY controller begins counting responsive to being set to the first value, and wherein the LPI timer of the slave PHY controller begins counting responsive to being set to the second value.

10. The method of claim 8, further comprising performing the refresh and quiet operations at the master PHY controller and the slave PHY controller according to the LPI timers of the master PHY controller and the slave PHY controller.

11. The method of claim 10, further comprising:
adapting echo canceler coefficients of the master PHY controller during the refresh operations at the master PHY controller while the slave PHY controller trains a channel equalizer of the slave PHY controller; and
adapting echo canceler coefficients of the slave PHY controller during the refresh operations at the slave PHY controller while the master PHY controller trains a channel equalizer of the master PHY controller.

12. The method of claim 10, wherein performing the refresh and quiet operations comprises cycling between the refresh and quiet operations, further comprising preventing the master PHY controller from performing refresh operations at a same time as the slave PHY controller.

13. The method of claim 10, further comprising controlling transitions between the quiet and refresh operations as a function of symbol periods, and wherein the first and second values are defined as a function of the symbol periods.

14. The method of claim 10, further comprising setting a transmission mode of the master PHY controller to a silent or disabled state when the master PHY controller is performing quiet operations.

15. The method of claim 14, further comprising setting a transmission mode of the master PHY controller to an idle state when the master PHY controller is performing refresh operations.

16. The method of claim 10, further comprising controlling a transition by the master PHY controller from a sleep state to a quiet or refresh state as a function of a symbol period.

17. The method of claim 1, wherein the offset comprises symbol periods corresponding to 3000 microseconds.

18. A system comprising:
one or more processors configured to perform operations comprising:
initializing, by a master physical layer (PHY) controller, a connection over a network with a slave PHY controller;
during initialization of the connection by the master PHY controller with the slave PHY controller and prior to initially establishing a link between the master PHY controller and the slave PHY controller in which data is exchanged in a send idle or data state, synchronizing a low power idle (LPI) timer of the master PHY controller with a LPI timer of the slave PHY controller, the LPI timers of the master PHY controller and the slave PHY controllers configured to control when the master PHY controller and the slave PHY controllers start cycling refresh and quiet operations;
establishing an offset between the LPI timer of the master PHY controller and the LPI timer of the slave PHY controller; and
after synchronizing the timer of the master PHY controller with the LPI timer of the slave PHY controller, establishing the link between the master PHY controller and the slave PHY controller to enable the master PHY controller and the slave PHY controller to exchange the data.

19. The system of claim 18, wherein synchronizing the LPI timer of the master PHY controller with the LPI timer of the slave PHY controller comprises:
asserting a master LPI request signal by the master PHY controller; and
in response to determining at the slave PHY controller that the master LPI request signal has been asserted by the master PHY controller, asserting a slave LPI request signal by the slave PHY controller.

20. The system of claim 19, the operations comprising:
in response to determining at the master PHY controller that the slave LPI request signal has been asserted by the slave PHY controller:
de-asserting the master LPI request signal by the master PHY controller; and setting the LPI timer of the master PHY controller to a first value.

21. The system of claim 18, wherein the operations further comprise determining whether an LPI mode is enabled in the master PHY controller.

22. The system of claim 21, wherein the operations further comprise performing synchronization between the LPI timer of the master PHY controller and the LPI timer of the slave PHY controller in response to determining that the LPI mode is enabled in the master PHY controller.

23. The system of claim 21, wherein the operations further comprise establishing the link without synchronizing the LPI timer of the master PHY controller with the LPI timer of the slave PHY controller in response to determining that the LPI mode is disabled in the master PHY controller.

24. A non-transitory computer-readable medium comprising non-transitory computer-readable instructions that, when executed by one or more processors, configure the one or more processors to perform operations comprising:
   initializing, by a master physical layer (PHY) controller, a connection over a network with a slave PHY controller;
   during initialization of the connection by the master PHY controller with the slave PHY controller and prior to initially establishing a link between the master PHY controller and the slave PHY controller in which data is exchanged in a send idle or data state, synchronizing a low power idle (LPI) timer of the master PHY controller with a LPI timer of the slave PHY controller, the LPI timers of the master PHY controller and the slave PHY controllers configured to control when the master PHY controller and the slave PHY controllers start cycling refresh and quiet operations;
   establishing an offset between the LPI timer of the master PHY controller and the LPI timer of the slave PHY controller; and
   after synchronizing the timer of the master PHY controller with the LPI timer of the slave PHY controller, establishing the link between the master PHY controller and the slave PHY controller to enable the master PHY controller and the slave PHY controller to exchange the data.

25. The non-transitory computer-readable medium of claim 24, wherein the offset is a specified amount.

26. The non-transitory computer-readable medium of claim 24, wherein a transmission mode of the master PHY controller is set to a first mode during initialization, and wherein establishing the link comprises changing the transmission mode to a second mode from the first mode.

27. The non-transitory computer-readable medium of claim 24, wherein the operations further comprise determining whether an LPI mode is enabled in the master PHY controller.

28. The non-transitory computer-readable medium of claim 27, wherein the operations further comprise performing synchronization between the LPI timer of the master PHY controller and the LPI timer of the slave PHY controller in response to determining that the LPI mode is enabled in the master PHY controller.

29. The non-transitory computer-readable medium of claim 27, wherein the operations further comprise establishing the link without synchronizing the LPI timer of the master PHY controller with the LPI timer of the slave PHY controller in response to determining that the LPI mode is disabled in the master PHY controller.

* * * * *